US012613913B2

(12) United States Patent
Shen

(10) Patent No.: US 12,613,913 B2
(45) Date of Patent: Apr. 28, 2026

(54) STORYBOARD SCRIPT GENERATION METHOD AND SYSTEM

(71) Applicant: Shanghai Hode Information Technology Co., Ltd., Shanghai (CN)

(72) Inventor: Ziyi Shen, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 306 days.

(21) Appl. No.: 18/579,167

(22) PCT Filed: Jun. 23, 2022

(86) PCT No.: PCT/CN2022/100864
§ 371 (c)(1),
(2) Date: Jan. 12, 2024

(87) PCT Pub. No.: WO2023/284517
PCT Pub. Date: Jan. 19, 2023

(65) Prior Publication Data
US 2024/0346719 A1 Oct. 17, 2024

(30) Foreign Application Priority Data
Jul. 15, 2021 (CN) .......................... 202110802626.4

(51) Int. Cl.
*G06F 16/738* (2019.01)
*G06T 11/20* (2006.01)
*G06T 7/73* (2017.01)

(52) U.S. Cl.
CPC .......... *G06F 16/739* (2019.01); *G06T 11/206* (2013.01); *G06T 7/73* (2017.01)

(58) Field of Classification Search
CPC ........................... G06F 16/739; G06T 11/206
See application file for complete search history.

(56) References Cited

U.S. PATENT DOCUMENTS 6,175,864 B1 1/2001 Addison et al.
10,452,920 B2 * 10/2019 Kauffmann .......... G11B 27/031
(Continued)

FOREIGN PATENT DOCUMENTS

CN 1704943 A 12/2005
CN 103839562 A 6/2014
(Continued)

OTHER PUBLICATIONS

International Patent Application No. PCT/CN2022/100864; Int'l Search Report; dated Aug. 18, 2022; 2 pages.

*Primary Examiner* — Michelle L Sams
(74) *Attorney, Agent, or Firm* — BakerHostetler

(57) ABSTRACT

This application provides a storyboard script generation method. The method includes obtaining a reference image used to generate a storyboard script; obtaining an element of the reference image and element vector information of the element; obtaining a vector element matching the element; and generating the storyboard script by setting the vector element on a specified canvas based on the element vector information. According to the storyboard script generation method provided in this application, the element in the reference image is identified, and the matched vector element is correspondingly set on the specified canvas, to obtain the storyboard script in a form of a vector graph. Therefore, it is more efficient and easier to produce the storyboard script, and user experience is effectively improved.

20 Claims, 9 Drawing Sheets

(56)     References Cited

U.S. PATENT DOCUMENTS

2011/0113336 A1*   5/2011   Gunatilake   ..........   H04L 67/535
                                                    715/723
2018/0356967 A1*   12/2018   Rasheed   ..............   G06F 40/253

FOREIGN PATENT DOCUMENTS

CN      111641869   A   9/2020
CN      111667557   A   9/2020
JP      2005-167453  A   6/2005

* cited by examiner

10000

20000

30000

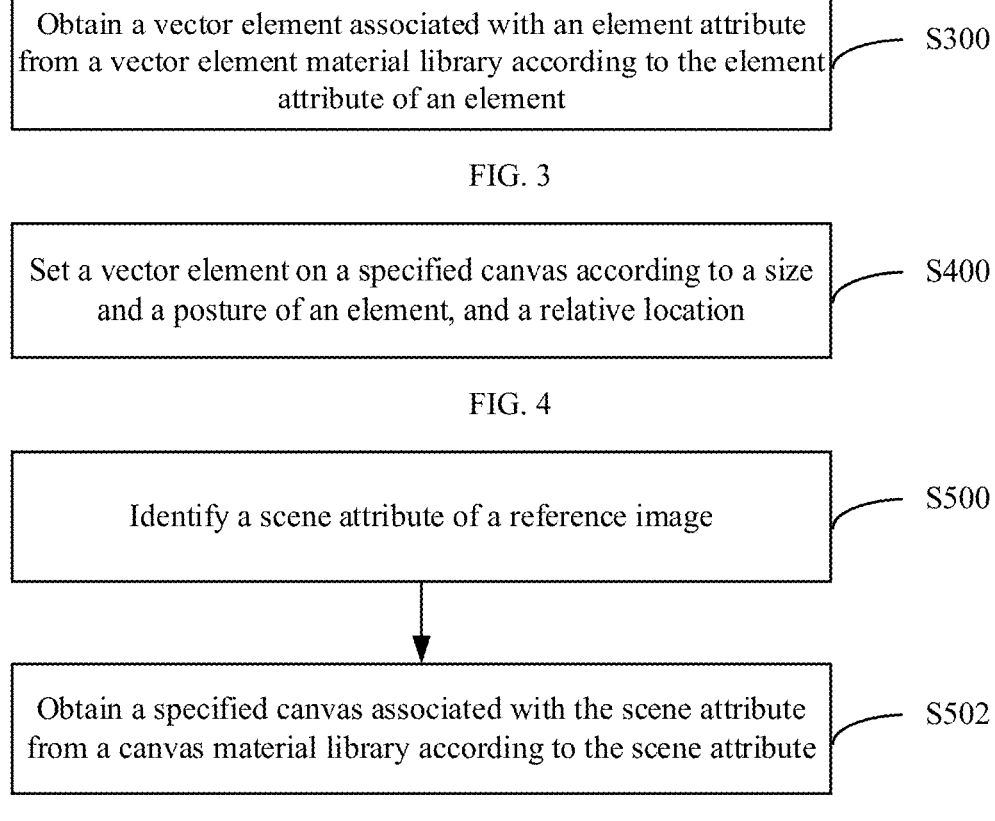

Obtain a vector element associated with an element attribute from a vector element material library according to the element attribute of an element                                    S300

FIG. 3

Set a vector element on a specified canvas according to a size and a posture of an element, and a relative location                                    S400

FIG. 4

Identify a scene attribute of a reference image                                    S500

Obtain a specified canvas associated with the scene attribute from a canvas material library according to the scene attribute                                    S502

FIG. 5

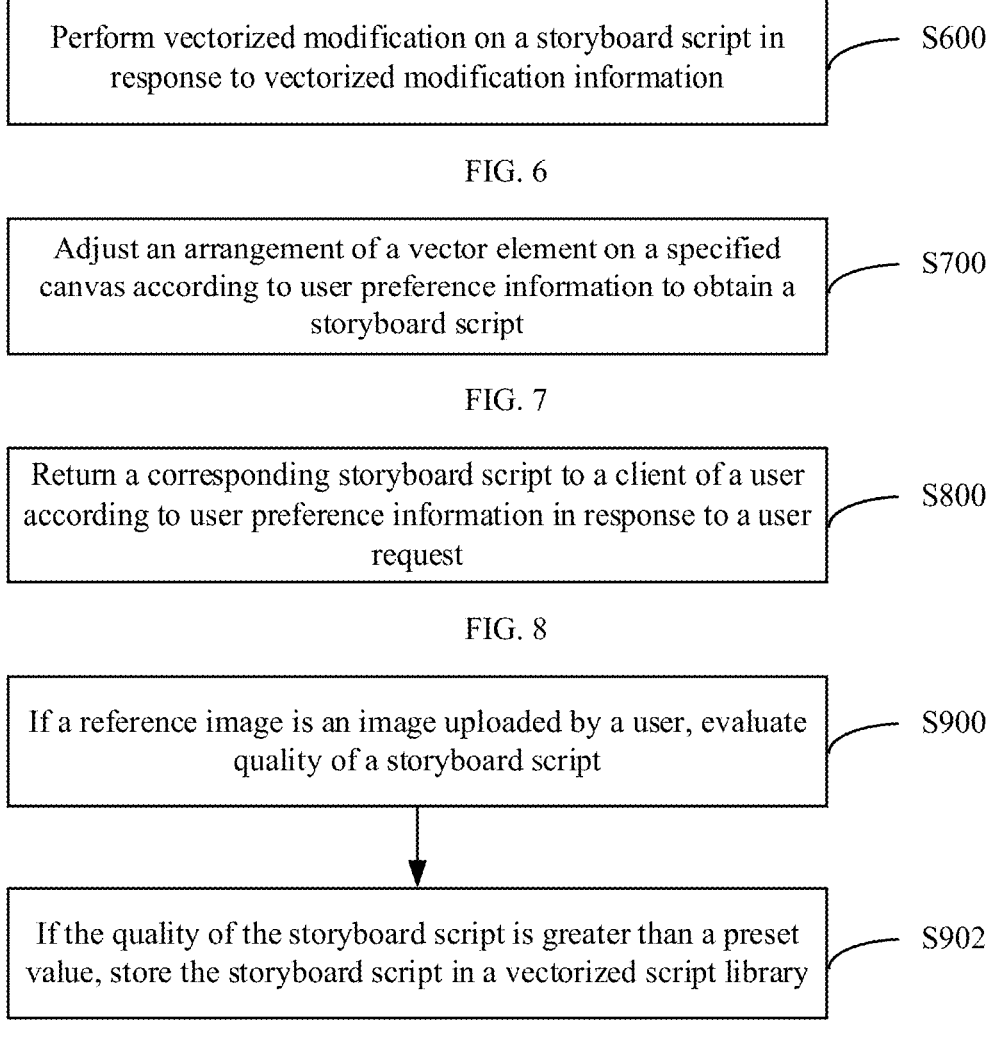

Perform vectorized modification on a storyboard script in response to vectorized modification information — S600

FIG. 6

Adjust an arrangement of a vector element on a specified canvas according to user preference information to obtain a storyboard script — S700

FIG. 7

Return a corresponding storyboard script to a client of a user according to user preference information in response to a user request — S800

FIG. 8

If a reference image is an image uploaded by a user, evaluate quality of a storyboard script — S900

If the quality of the storyboard script is greater than a preset value, store the storyboard script in a vectorized script library — S902

FIG. 9

Obtain input information, where the input information includes a keyword — S1100

Obtain a reference storyboard script associated with the keyword from a vectorized script library — S1102

Perform vectorized modification on the reference storyboard script in response to vectorized modification information to generate a storyboard script — S1104

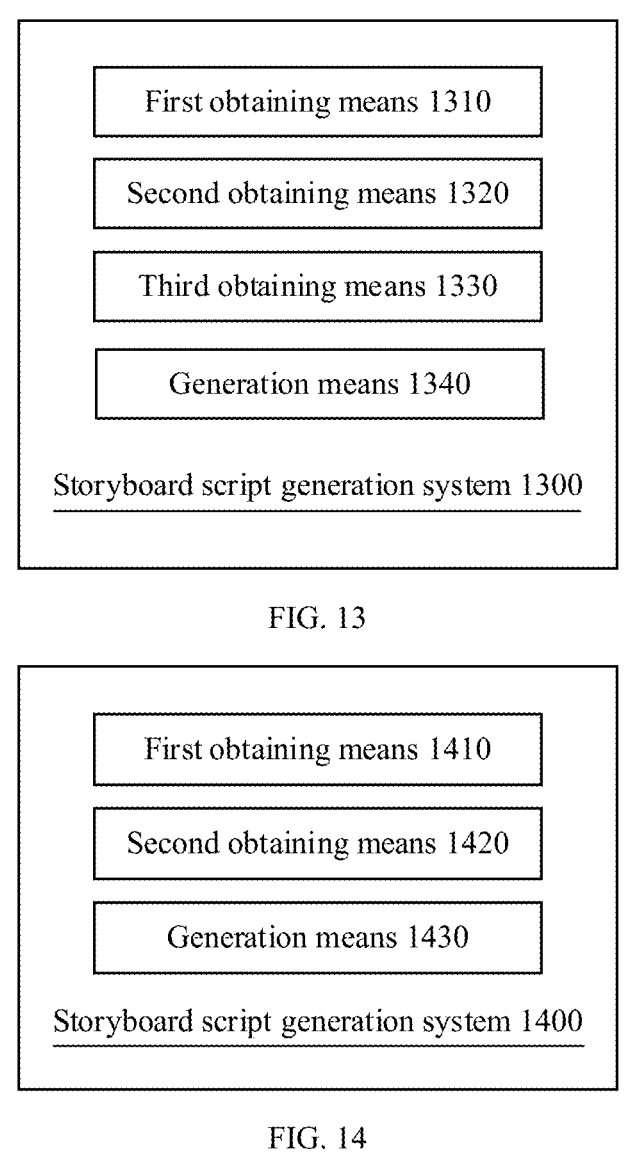

First obtaining means 1310

Second obtaining means 1320

Third obtaining means 1330

Generation means 1340

Storyboard script generation system 1300

FIG. 13

First obtaining means 1410

Second obtaining means 1420

Generation means 1430

Storyboard script generation system 1400

FIG. 14

STORYBOARD SCRIPT GENERATION METHOD AND SYSTEM

CROSS-REFERENCE TO RELATED APPLICATIONS

This application is the U.S. National Stage of International Application No. PCT/CN2022/100864, filed on Jun. 23, 2022, which claims priority to Chinese Patent application Ser. No. 202110802626.4, filed on Jul. 15, 2021, and entitled "STORYBOARD SCRIPT GENERATION METHOD AND SYSTEM", both of which are incorporated herein by reference in their entireties.

TECHNICAL FIELD

Embodiments of this application relate to the field of computer technologies, and in particular, to a storyboard script generation method and system, a computing device, and a computer-readable storage medium.

BACKGROUND

With lowering of barriers to entry for video shooting, more users become creators, to shoot and create videos. To shoot a video with a relatively long time or relatively rich content, a creator usually needs to conceive and set up shot content in advance, for example, draw a storyboard script to record and organize conception. However, the inventor is aware that it is difficult and inefficient for an ordinary user who does not learn a professional shooting technique to draw a storyboard script, which affects user experience.

SUMMARY

An objective of embodiments of this application is to provide a storyboard script generation method and system, a computing device, and a computer-readable storage medium, to resolve the following problem: It is difficult and inefficient to draw a storyboard script, and user experience is affected.

An aspect of the embodiments of this application provides a storyboard script generation method, and the method includes:

obtaining a reference image used to draw a storyboard script;

obtaining an element of the reference image and element vector information of the element;

obtaining a vector element matching the element; and setting the vector element on a specified canvas according to the element vector information to generate the storyboard script.

Optionally, the obtaining a vector element matching the element includes:

obtaining the vector element associated with the element attribute from a vector element material library according to an element attribute of the element.

Optionally, the element vector information includes a size and a posture of the element, and a relative location of the element in the reference image; and the setting the vector element on a specified canvas according to the element vector information to generate the storyboard script includes:

setting the vector element on the specified canvas according to the size and the posture of the element, and the relative location.

Optionally, the method further includes:

identifying a scene attribute of the reference image; and obtaining the specified canvas associated with the scene attribute from a canvas material library according to the scene attribute.

Optionally, the storyboard script includes an editable vector graph; and the method further includes:

performing vectorized modification on the storyboard script in response to vectorized modification information.

Optionally, the method further includes:

adjusting an arrangement of the vector element on the specified canvas according to user preference information to obtain the storyboard script.

Optionally, the method further includes:

returning a corresponding storyboard script to a client of a user according to the user preference information in response to a user request.

Optionally, the reference image is a video key frame; and/or the reference image is an image uploaded by the user.

Optionally, the method further includes:

if the reference image is the image uploaded by the user, evaluating quality of the storyboard script; and if the quality of the storyboard script is greater than a preset value, storing the storyboard script in a vectorized script library.

Optionally, the method further includes:

obtaining input information, where the input information includes a keyword;

obtaining a reference storyboard script associated with the keyword from the vectorized script library; and performing vectorized modification on the reference storyboard script in response to the vectorized modification information to generate the storyboard script.

An aspect of the embodiments of this application further provides a storyboard script generation system, including:

a first obtaining means, configured to obtain a reference image used to draw a storyboard script;

a second obtaining means, configured to obtain an element of the reference image and element vector information of the element;

a third obtaining means, configured to obtain a vector element matching the element; and a generation means, configured to set the vector element on a specified canvas according to the element vector information to generate the storyboard script.

An aspect of the embodiments of this application further provides a storyboard script generation method, and the method includes:

obtaining input information, where the input information includes a keyword; and obtaining a reference storyboard script associated with the keyword from a vectorized script library, where the vectorized script library includes a plurality of candidate storyboard scripts, and the plurality of candidate storyboard scripts are generated according to the foregoing method.

Optionally, the method further includes:

performing vectorized modification on the reference storyboard script in response to the vectorized modification information to generate the storyboard script.

An aspect of the embodiments of this application further provides a storyboard script generation system, including:

a first obtaining means, configured to obtain input information, where the input information includes a keyword; and a second obtaining means, configured to obtain a reference storyboard script associated with the keyword from a vectorized script library, where the vectorized script library includes a plurality of candidate storyboard scripts, and the plurality of candidate storyboard scripts are generated according to the foregoing method.

An aspect of the embodiments of this application further provides a computing device, including a memory, a processor, and computer-readable instructions stored in the memory and capable of being run on the processor, and the processor executes the computer-readable instructions to implement the steps of the storyboard script generation method.

An aspect of the embodiments of this application further provides a computer-readable storage medium, storing computer-readable instructions, and the computer-readable instructions can be executed by at least one processor, so that the at least one processor executes the computer-readable instructions to implement the steps of the storyboard script generation method.

According to the storyboard script generation method and system, the device, and the computer-readable storage medium provided in the embodiments of this application, the element in the reference image is identified, and the matched vector element is correspondingly set on the specified canvas, to obtain the storyboard script in a form of a vector graph. Therefore, it is more efficient and easier to produce the storyboard script, and user experience is effectively improved.

BRIEF DESCRIPTION OF DRAWINGS

FIG. 3 is a flowchart of a sub-step of step S204 in FIG. 2;

FIG. 4 is a flowchart of a sub-step of step S206 in FIG. 2;

FIG. 5 to FIG. 9 are schematic flowcharts of newly-added steps of a storyboard script generation method according to Embodiment 1 of this application;

FIG. 13 is a schematic block diagram of a storyboard script generation system according to Embodiment 3 of this application;

FIG. 14 is a schematic block diagram of a storyboard script generation system according to Embodiment 4 of this application.

DESCRIPTION OF EMBODIMENTS

Figure 1:
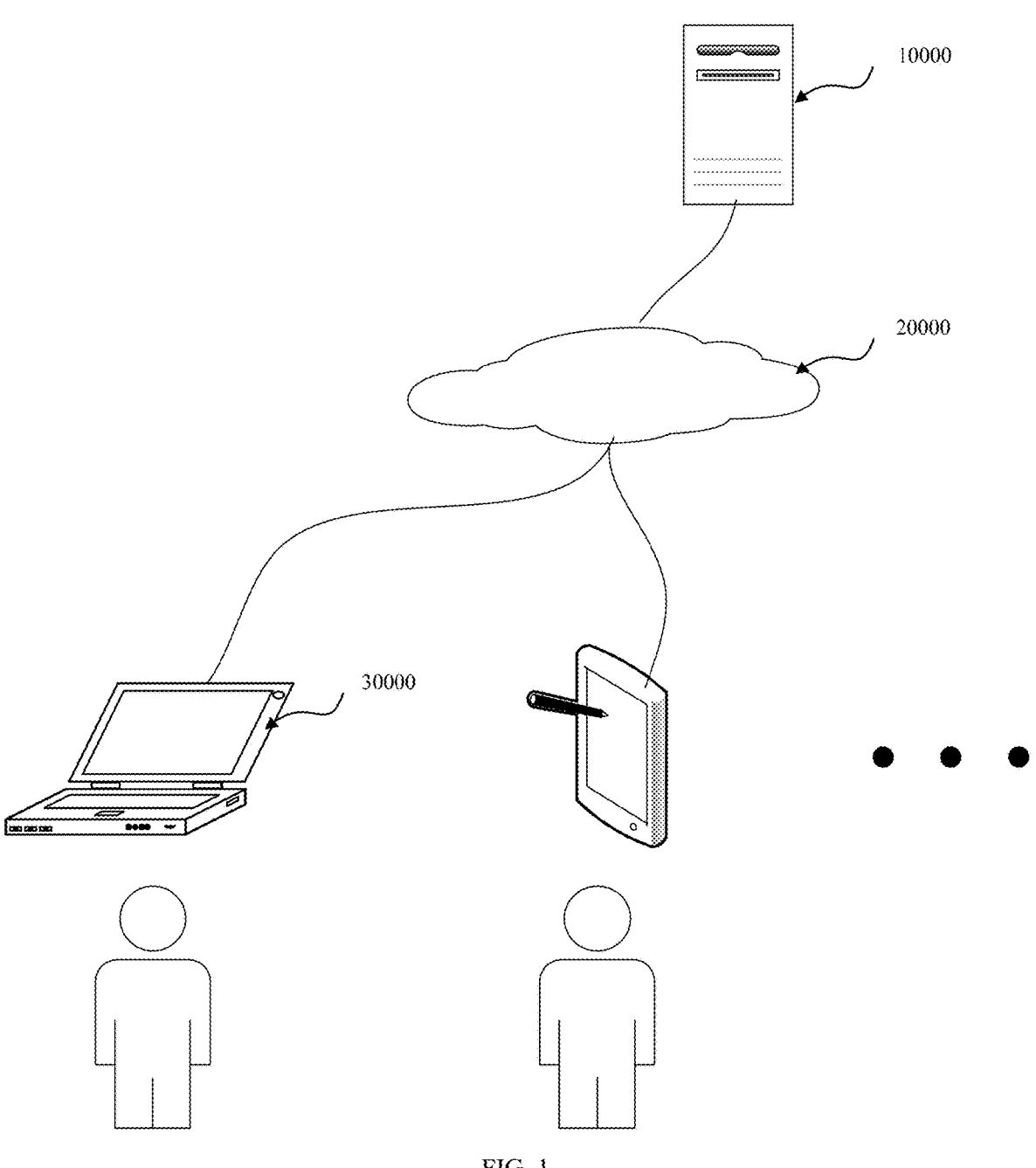
FIG. 1 is a schematic diagram of an application environment of a storyboard script generation method according to an embodiment of this application.

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on the embodiments of this application without creative efforts shall fall within the protection scope of this application.

It should be noted that the descriptions such as "first" and "second" in the embodiments of this application are merely used for description, and shall not be understood as an indication or implication of relative importance or an implicit indication of a quantity of indicated technical features. Therefore, a feature limited by "first" or "second" may explicitly or implicitly include at least one feature. In addition, the technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

To shoot a video with a relatively long time or relatively rich content, a storyboard script usually needs to be drawn. Advantages of the storyboard script are as follows: On the one hand, in a shooting process, early-stage planned content can be better grasped by using the storyboard script. On the other hand, with development of video creation assisted by a plurality of persons, when script drawing, video shooting, and video editing need to be performed by a plurality of persons, a clear storyboard script is an important guarantee for smooth collaboration to complete high-quality video shooting.

Currently, drawing of a storyboard script is mainly used in a professional film and television team with a professional painter. Due to limitation conditions such as a drawing threshold and a film and television creation foundation, an ordinary creator is often reluctant to draw a storyboard script for content shot by the creator because drawing of a high-quality storyboard script is excessive energy-consuming and a threshold is excessively high. However, in a shooting process, in particular, in a creation process of a video requiring a relatively long time or relatively rich content, a final shooting result often differs greatly from pre-set conception in an early stage. This is mainly due to inability to accurately reproduce an early-stage planned video creation during the shooting process. Therefore, a better video indicates a higher creation threshold.

In view of this, this application aims to provide a storyboard script generation solution based on a video analysis framework, to initialize a storyboard script for a user by using an intelligent means, vectorize script content, reduce user using difficulty, and improve experience of drawing a storyboard script, thereby improving video creation efficiency, and assisting in shooting a high-quality video. For example, various content (for example, an object, a scene, and a character) in an image is detected by using artificial intelligence, and related information (for example, a location, a size, and a posture) is vectorized, and an editable vector graph and a canvas are generated. On the one hand, a vector graph best matching a user requirement may be searched in a storyboard script library according to a scene and information that are input by the user, and the vector graph is provided to the user as an initialization storyboard script. The user may modify vectorized content or add an additional vectorized element. On the other hand, it can support the user to upload a real image, analyze content of the real image, search the script library for a congeneric element that appears in the real image, and online generate a personalized vector graph conforming to the content of the image. In this solution, a threshold for the user to use the storyboard script can be effectively reduced, so that the user can draw a manuscript more conveniently and quickly, thereby helping the user to better perform early-stage planning of video creation and story creation.

This application provides a plurality of embodiments to further describe the storyboard script generation solution. For details, refer to the following descriptions.

In the descriptions of this application, it should be understood that numerical symbols before steps do not indicate a sequence of performing the steps, but are merely used to facilitate description of this application and differentiation of each step, and therefore cannot be construed as a limitation on this application.

The following provides an explanation of the terms in this application:

A storyboard script refers to that, for various visual media such as a movie, an animation, a television play, an advertisement, and an MTV, before actual shooting, a composition of an image is described in a story grid, continuous pictures are decomposed by using once camera movement as a unit, and a camera movement manner, a time length, a dialogue, a special effect and the like are marked. In this way, required shooting content is briefly recorded in an early stage of shooting, to serve as a reminder for each storyboard in a shooting process.

FIG. 1 is a schematic diagram of an environmental application according to an embodiment of this application. As shown in FIG. 1:

A computing device 10000 may be connected to a client 30000 by using a network 20000.

The computing device 10000 may provide a service, for example, generate a storyboard script, or return the storyboard script to the client 30000.

The computing device 10000 may be located in a data center such as a single site, or may be distributed at different geographic locations (for example, in a plurality of sites). The computing device 10000 may provide a service by using one or more networks 20000. The network 20000 includes various network devices such as a router, a switch, a multiplexer, a hub, a modem, a bridge, a repeater, a firewall, and/or a proxy device. The network 20000 may include a physical link, for example, a coaxial cable link, a twisted-pair cable link, an optical fiber link, or a combination thereof. The network 20000 may include a radio link, for example, a cellular link, a satellite link, or a Wi-Fi link.

The computing device 10000 may be implemented by one or more computing nodes. The one or more computing nodes may include virtualized computing instances. The virtualized computing instance may include simulation of a virtual machine such as a computer system, an operating system, or a server. The computing node may load the virtual machine based on a virtual image and/or other data that defines specific software (for example, an operating system, a dedicated application program, or a server) for simulation. As requirements for different types of processing services change, different virtual machines may be loaded and/or terminated on the one or more computing nodes. A management program may be implemented to manage use of different virtual machines on a same computing node.

The client 30000 may be configured to access content and a service of the computing device 10000. The client 30000 may include any type of electronic device, for example, a mobile device, a tablet device, a laptop computer, a workstation, a virtual reality device, a game device, a set-top box, a digital streaming device, a vehicle terminal, a smart television, or a set-top box.

The client 30000 may output (for example, display, render, or present) the storyboard script or the like to a user.

The following describes a storyboard script generation solution in a plurality of embodiments. The solution may be implemented by using the computing device 10000.

Embodiment 1

Figure 2:
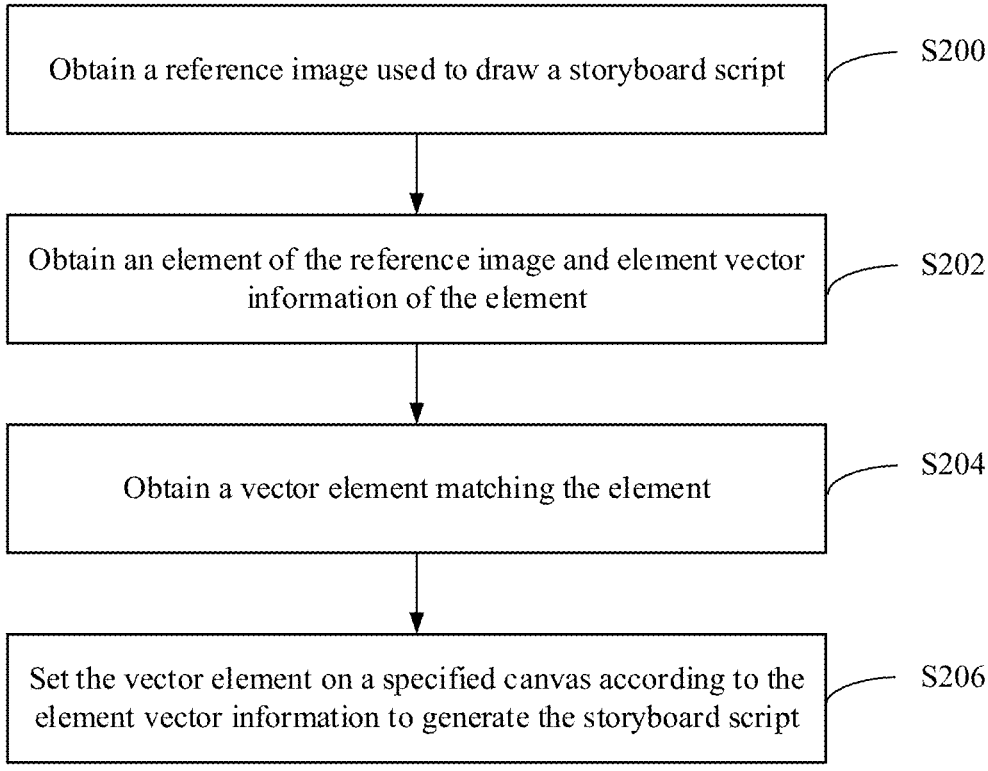
FIG. 2 is a schematic flowchart of a storyboard script generation method according to Embodiment 1 of this application.

FIG. 2 is a schematic flowchart of a storyboard script generation method according to Embodiment 1 of this application.

As shown in FIG. 2, the storyboard script generation method may include steps S200 to S206.

Step S200: Obtain a reference image used to draw a storyboard script.

The reference image may be a video key frame, may be an image uploaded by a user, or another image.

The video key frame may be a highlight film/television picture in some excellent film and television works.

In this embodiment, whether a picture is a video key frame may be determined according to a quantity of bullet-screen comments of the video key frame by using artificial intelligence (for example, a trained neural network model) or may be determined in another manner.

Step S202: Obtain an element of the reference image and element vector information of the element.

The element may include a character, an object, and the like.

The element vector information includes a size and a posture of the element, a relative location of the element in the reference image, and the like.

As an example, the element in the reference image or the posture of the element may be identified by using artificial intelligence, for example:

(1) A character in the reference image may be detected, for example, based on a trained character identification model combining a head and a human body.

(2) A posture of the human body may be detected, for example, based on a trained distributed perception coordinate representation model for posture estimation of the human body.

(3) An object in the reference image may be detected, for example, based on a convolutional network for high-quality object detection and instance segmentation.

The foregoing enumerates several elements such as the character and the object. It should be noted that the character may be further subdivided and identified, for example, a child or an elderly person, and the object may also be further subdivided and identified, for example, a poplar, a willow, a carriage, and an ox.

Step S204: Obtain a vector element matching the element.

The vector element, for example, an element attribute, may be matched according to relevant information of the element.

As an example, as shown in FIG. 3, step S204 may include step S300: Obtain the vector element associated with the element attribute from a vector element material library according to the element attribute of the element. In this embodiment, the matched vector element may be effectively found by using the element attribute. The element attribute may include an element category or the like. The vector element material library is used to store and manage a large quantity of vector elements for use.

Step S206: Set the vector element on a specified canvas according to the element vector information to generate the storyboard script.

The vector element is set on the specified canvas to obtain a vector graph, and the vector graph is the storyboard script.

The storyboard script generation method provided in Embodiment 1 of this application includes the following advantages:

The element in the reference image is identified, and the matched vector element is correspondingly set on the specified canvas, to obtain the storyboard script in a form of a vector graph. Therefore, it is more efficient and easier to produce the storyboard script, and user experience is effectively improved.

When the reference image is a video key frame, a corresponding storyboard script may be generated based on a composition of the excellent film and television works.

When the reference image is an image uploaded by the user, a corresponding storyboard script may be efficiently generated according to conception of the user.

The following provides several optional embodiments to optimize the storyboard script generation method. Details are as follows:

As an example, the element vector information includes the size and the posture of the element, and the relative location of the element in the reference image. As shown in FIG. 4, step S206 may include step S400: Set the vector element on the specified canvas according to the size and the posture of the element, and the relative location. For example, a size of the vector element on the specified canvas is determined according to the size of the element; a posture of the vector element on the specified canvas is determined according to the posture of the element; and a relative location of the vector element on the specified canvas is determined according to the relative location of the element in the reference image. In this embodiment, the element in the reference image can be efficiently and accurately mapped to the specified canvas.

As an example, as shown in FIG. 5, the storyboard script generation method may further include steps S500 and S502. Step S500: Identify a scene attribute of the reference image. Step S502: Obtain the specified canvas associated with the scene attribute from a canvas material library according to the scene attribute. The scene attribute may include a scene category and the like. The canvas material library is used to store and manage a large quantity of canvases for use. In this embodiment, a scene in the reference image may be efficiently arranged and mapped to the storyboard script.

As an example, the storyboard script includes an editable vector graph. As shown in FIG. 6, the storyboard script generation method may further include step S600: Perform vectorized modification on the storyboard script in response to vectorized modification information. The vectorized modification includes at least one of the following items: modifying the size of the vector element, modifying the posture of the vector element, modifying the relative location of the vector element on the specified canvas, deleting the vector element, or adding a new vector element. This embodiment enables the user to draw the storyboard script in a personalized manner.

As an example, as shown in FIG. 7, the storyboard script generation method may further include step S700: Automatically adjust an arrangement of the vector element on the specified canvas according to user preference information to obtain the storyboard script. In this embodiment, by analyzing a personalized drawing habit of the user, a user portrait, and the like, a storyboard script that matches the drawing habit of the user can be more accurately generated, thereby further improving script creation efficiency and user stickiness. It should be noted that the user preference information may include preference information obtained according to the user portrait. The location, the size, and the like of the vector element are automatically adjusted according to the user preference information, for example, a user preference on camera movement.

As an example, as shown in FIG. 8, the storyboard script generation method may further include step S800: Return a corresponding storyboard script to a client of the user according to the user preference information in response to a user request. In this embodiment, by analyzing a personalized drawing habit of the user, a user portrait, and the like, a storyboard script that matches the drawing habit of the user can be more accurately pushed, thereby further improving script creation efficiency and user stickiness.

For example, the drawing habit of the user is analyzed, to analyze information such as a scene, a quantity of characters, a posture, and a stance that are preferentially selected for creation by the user. After a creation habit and creation content of the user are obtained, a storyboard script that is of a similar scene and that is for shooting a similar person or object is recommended for the user. For example, for shooting a vehicle test and evaluation, a recommended script includes another storyboard script for shooting a vehicle. This helps the user understand how to complete coherent video content that alternates between vehicle explanations.

As an example, as shown in FIG. 9, the storyboard script generation method may further include steps S900 and S902. Step S900: If the reference image is an image uploaded by the user, evaluate quality of the storyboard script. Step S902: If the quality of the storyboard script is greater than a preset value, store the storyboard script in a vectorized script library. By selecting an excellent storyboard script, the vectorized script library can be expanded to improve reusability.

For an excellent script, quality evaluation may be performed in the following manner: measuring similarity between the storyboard script and a deconstructed script of a professional film and television shooting work that exists in a cold start library. A higher similarity indicates higher script quality.

As an example, the storyboard script generation method may further include the following steps: obtaining input information, where the input information includes a keyword; obtaining a reference storyboard script associated with the keyword from the vectorized script library; and performing vectorized modification on the reference storyboard script in response to the vectorized modification information to generate the storyboard script. In this embodiment, the input information such as the keyword input by the user is used, the matched storyboard script is used as the reference storyboard script, and vectorized modification is performed based on the reference storyboard script. Therefore, it is more efficient and easier to produce the storyboard script, and user experience is effectively improved.

Figure 10:
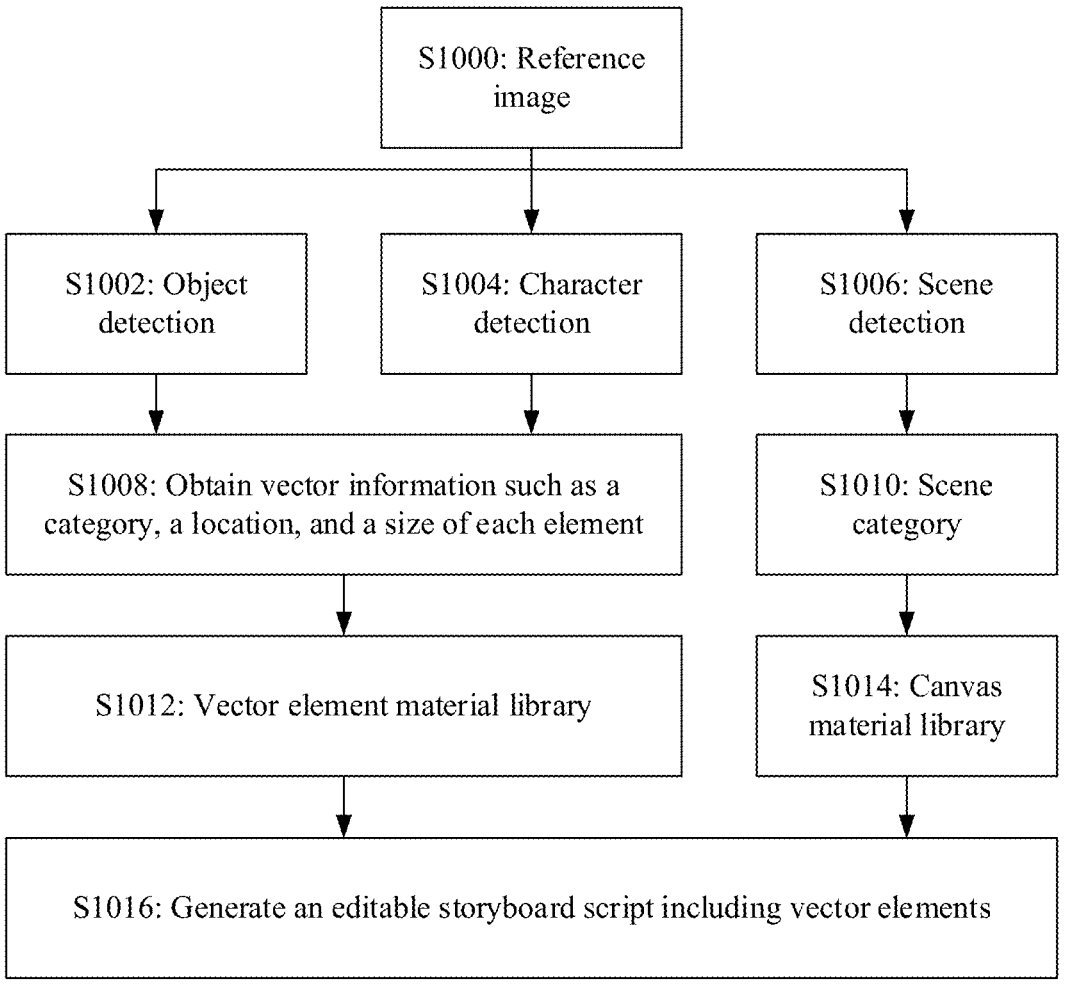
FIG. 10 shows a schematic drawing process of a storyboard script according to Embodiment 1.

For ease of understanding, the following provides an operation example with reference to FIG. 10.

S1000: Obtain a reference image, for example, a video key frame or an image uploaded by a user.

S1002: Perform object detection to identify an object (namely, an element).

S1004: Perform character detection to identify a character (namely, an element).

S1006: Perform scene detection to identify a scene.

S1008: Obtain vector information such as a category, a location, and a size of each element.

S1010: Obtain a scene category of the scene.

S1012: Obtain, from a vector element material library according to an element type of each element, a vector element that one-to-one matches each element.

S1014: Obtain, from a canvas material library according to the scene category, a specified canvas matching the scene.

S1016: Draw, according to vector information such as the location and the size of each element, the vector element that one-to-one matches each element on the specified canvas, to generate an editable storyboard script including a plurality of vector elements.

Drawing process: FIG. 10 shows a drawing process of a storyboard script. In this procedure, content (for example, an element and element vector information) of the video key frame may be identified and estimated by using an artificial intelligence algorithm. In this procedure, an object, a character, a scene, and the like may be identified, and vectorized information of the object, the character, and the like may be estimated, for example, a relative location, a size, and a posture. Based on the foregoing information, the following operations may be performed: The matched vector element (for example, a vector element of a same type) is searched from the vector element material library based on the category of each element. A matched canvas (for example, an office background canvas) is searched from the canvas material library based on the category of the scene, and the canvas is used as the specified canvas of the storyboard script. Then, each vector element is automatically arranged on the specified canvas accordingly based on vectorized information of each element to generate the storyboard script. It should be noted that a plurality of storyboard scripts may include indication content used to indicate entire video production.

Interacting with the user and iterating:

(1) The user may create a video by using a storyboard script generated based on an excellent video key frame provided by cold start, or on this basis, perform vectorized modification on the storyboard script, for example, modifying the location and the size of the vector element, and adding or deleting the vector element. In this way, the user is assisted in drawing a personalized storyboard script. The user may alternatively upload an individual storyboard script. Based on receiving of the storyboard script, the computing device 10000 selects the excellent storyboard script, to expand the vectorized script library. On the one hand, the user may better obtain more storyboard scripts. On the other hand, after the personalized drawing habit of the user is analyzed, a storyboard script meeting the drawing habit of the user may be recommended for the user, thereby further improving efficiency of producing the storyboard script and user stickiness.

It should be noted that vectorized modification may be performed on the storyboard script by using an instruction such as selecting, dragging, or modifying.

(2) The user may upload an image that the user thinks better match needs of the user. The computing device 10000 may perform online analysis on the image uploaded by the user, and according to an analysis result, matches the vector element in the vector element material library and obtains a canvas meeting a scene identification result of the image, to generate a personalized storyboard script for direct use by the user.

Embodiment 2

This embodiment provides another storyboard script generation method. For technical details and effects of the storyboard script generation method, refer to the foregoing descriptions.

Figure 11:
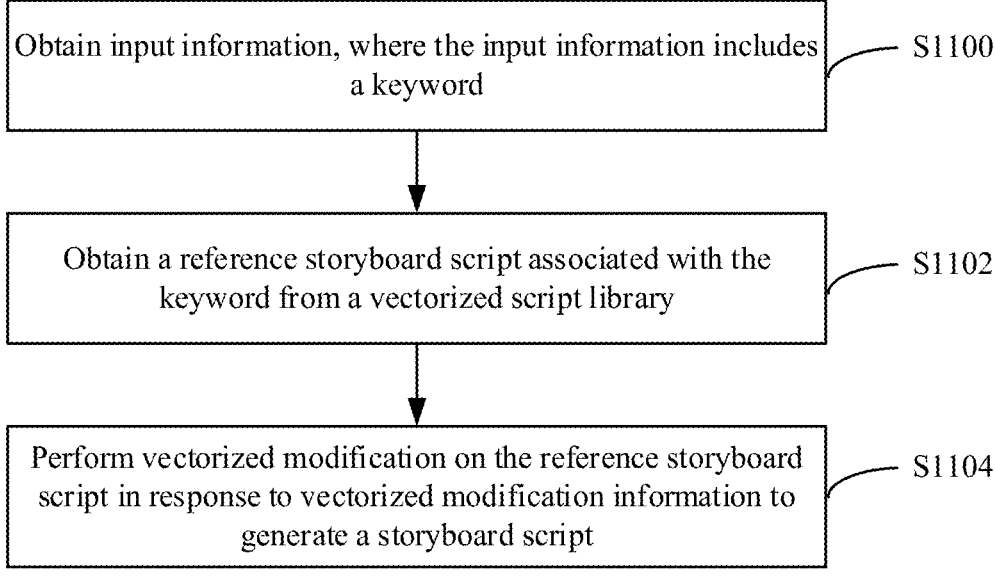
FIG. 11 is a schematic flowchart of a storyboard script generation method according to Embodiment 2 of this application.

FIG. 11 is a schematic flowchart of a storyboard script generation method according to Embodiment 2 of this application.

As shown in FIG. 11, the storyboard script generation method may include steps S1100 to S1104.

Step S1100: Obtain input information, where the input information includes a keyword.

Step S1102: Obtain a reference storyboard script associated with the keyword from a vectorized script library.

The vectorized script library includes a plurality of candidate storyboard scripts, and the plurality of candidate storyboard scripts are generated according to the method in Embodiment 1.

Optionally, step S1104: Perform vectorized modification on the reference storyboard script in response to vectorized modification information to generate a storyboard script.

The storyboard script generation method provided in Embodiment 2 of this application includes the following advantages: The input information such as the keyword input by the user is used, a matched storyboard script is used as the reference storyboard script, and vectorized modification is performed based on the reference storyboard script. Therefore, it is more efficient and easier to produce the storyboard script, and user experience is effectively improved.

The input information may include a whole of the storyboard script, related content, and the like.

As an example, the computing device 10000 may search for a most matched reference storyboard script for the user according to a similar label and the like. The user may directly use the reference script or perform content adjustment, so that the reference script meets shot content.

For example, a vectorized material library pre-stores a subject and shot content of each script. The user only needs to input keywords to provide information such as a subject and content the user wants to shoot. In this case, the user may find shot content or a script with a same (similar) label in the vectorized material library. For example, by using keywords "home", "shooting", "lipstick", and "test and evaluation", the user may obtain an environment canvas at home, and a related script including lipstick content and test and evaluation content.

Figure 12:
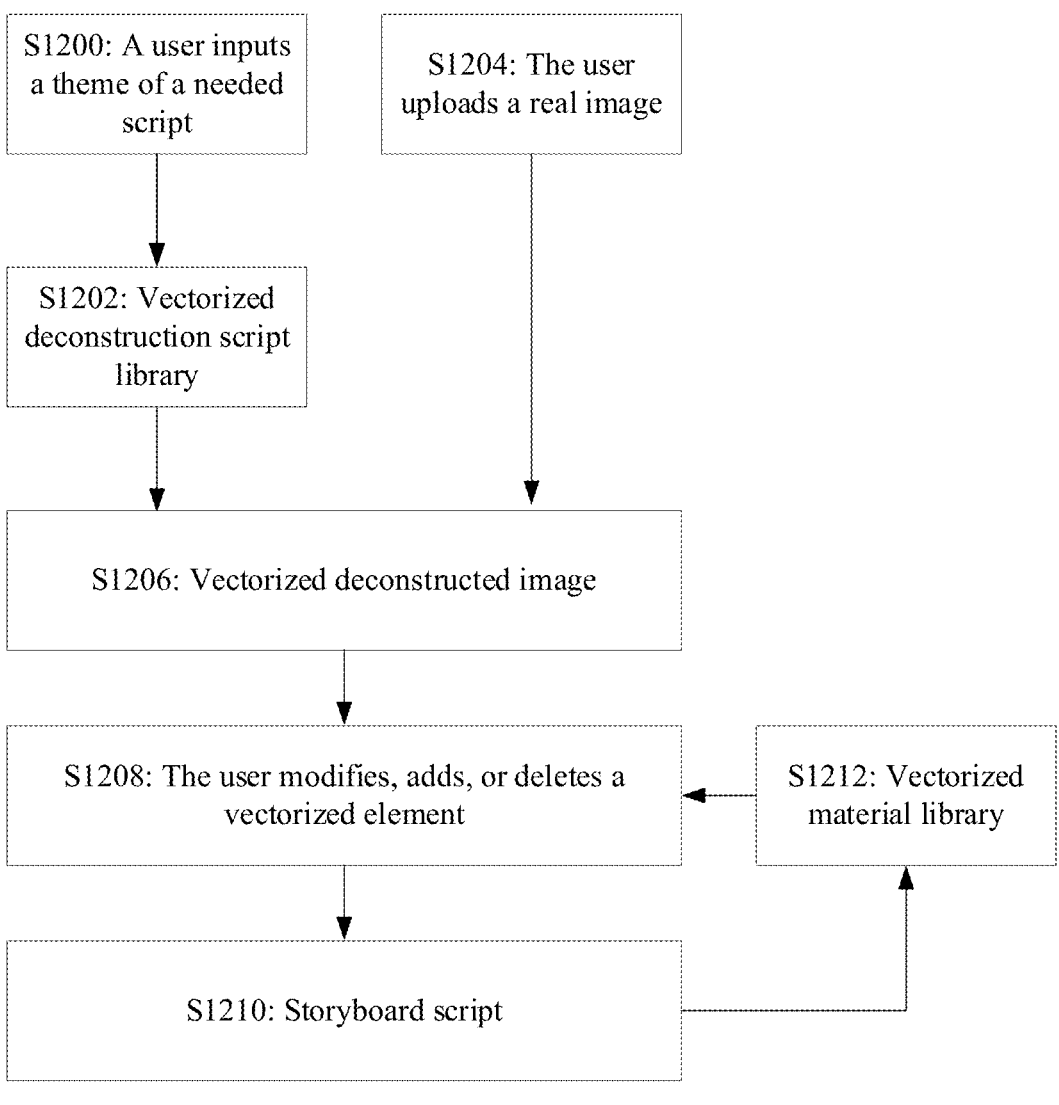
FIG. 12 shows a schematic drawing process of a storyboard script according to Embodiment 2.

For ease of understanding, the following provides an operation example with reference to FIG. 12.

S1200: The user inputs a theme of a needed script.

S1202: Retrieve a vectorized deconstruction script library according to the theme.

The vectorized deconstruction script library is a whole creation script of a story. Each script contains a plurality of vectorized deconstructed images. For example, shooting a cosmetic test and evaluation may include a plurality of vectorized deconstructed images in the following: a vectorized deconstructed image of a half-body of an online streamer being in explaining, a vectorized deconstructed image of a feature of the mouth of the online streamer, and a vectorized deconstructed image of a feature of a cosmetic. The script includes a plurality of vectorized deconstructed images arranged in a time sequence.

S1204: The user uploads a real image. A corresponding vectorized deconstructed image may alternatively be generated based on the real image.

S1206: Obtain the vectorized deconstructed image based on S1202 or S1204.

The vectorized deconstructed image may include a vector element, a size, and a location (the foregoing information may be described by using coordinates, a pixel quantity, an object label, and the like). The user may roughly perform portrait reconstruction according to the vectorized deconstructed image.

S1208: The user modifies, adds, or deletes a vectorized element in the vectorized deconstructed image.

S1210: Obtain a final vectorized deconstructed image, namely, the storyboard script, based on S1208.

S1212: The storyboard script obtained based on S1208 may be stored in the vectorized material library.

Embodiment 3

FIG. 13 is a schematic block diagram of a storyboard script generation system according to Embodiment 3 of this application. The storyboard script generation system may be divided into one or more program means. The one or more program means are stored in a storage medium, and are executed by one or more processors, to complete this embodiment of this application. The program means in this embodiment of this application is a series of computer-readable instruction segments that can complete a specific function. The following specifically describes a function of each program means in this embodiment of this application.

As shown in FIG. 13, the storyboard script generation system 1300 may include a first obtaining means 1310, a second obtaining means 1320, a third obtaining means 1330, and a generation means 1340.

The first obtaining means 1310 is configured to obtain a reference image used to draw a storyboard script.

The second obtaining means 1320 is configured to obtain an element of the reference image and element vector information of the element.

The third obtaining means 1330 is configured to obtain a vector element matching the element.

The generation means 1340 is configured to set the vector element on a specified canvas according to the element vector information to generate the storyboard script.

As an example, the second obtaining means 1320 is further configured to:

obtain the vector element associated with the element attribute from a vector element material library according to an element attribute of the element.

As an example, the element vector information includes a size and a posture of the element, and a relative location of the element in the reference image; and the generation means 1340 is further configured to:

set the vector element on the specified canvas according to the size and the posture of the element, and the relative location.

As an example, the storyboard script generation system 1300 may further include a fourth obtaining means, configured to:

identify a scene attribute of the reference image; and obtain the specified canvas associated with the scene attribute from a canvas material library according to the scene attribute.

As an example, the storyboard script includes an editable vector graph; and the storyboard script generation system 1300 may further include a modification means, configured to:

perform vectorized modification on the storyboard script in response to vectorized modification information.

As an example, the storyboard script generation system 1300 may further include an adjustment means, configured to:

adjust an arrangement of the vector element on the specified canvas according to user preference information to obtain the storyboard script.

As an example, the storyboard script generation system 1300 may further include a return means, configured to:

return a corresponding storyboard script to a client of a user according to the user preference information in response to a user request.

As an example, the reference image is a video key frame; and/or the reference image is an image uploaded by the user.

As an example, the storyboard script generation system 1300 may further include a storage means, configured to:

if the reference image is the image uploaded by the user, evaluate quality of the storyboard script; and if the quality of the storyboard script is greater than a preset value, store the storyboard script in a vectorized script library.

As an example, the generation means 1340 is further configured to:

obtain input information, where the input information includes a keyword;

obtain a reference storyboard script associated with the keyword from the vectorized script library; and perform vectorized modification on the reference storyboard script in response to the vectorized modification information to generate the storyboard script.

Embodiment 4

FIG. 14 is a schematic block diagram of a storyboard script generation system according to Embodiment 4 of this application. The storyboard script generation system may be divided into one or more program means. The one or more program means are stored in a storage medium, and are executed by one or more processors, to complete this embodiment of this application. The program means in this embodiment of this application is a series of computer-readable instruction segments that can complete a specific function. The following specifically describes a function of each program means in this embodiment of this application.

As shown in FIG. 14, the storyboard script generation system 1400 may include a first obtaining means 1410, a second obtaining means 1420, and a generation means 1440.

The first obtaining means 1410 is configured to obtain input information, where the input information includes a keyword.

The second obtaining means 1420 is configured to obtain a reference storyboard script associated with the keyword from a vectorized script library, where the vectorized script library includes a plurality of candidate storyboard scripts, and the plurality of candidate storyboard scripts are generated according to the method in Embodiment 1.

Optionally, the generation means 1430 is configured to perform vectorized modification on the reference storyboard script in response to vectorized modification information to generate a storyboard script.

Embodiment 5

Figure 15:
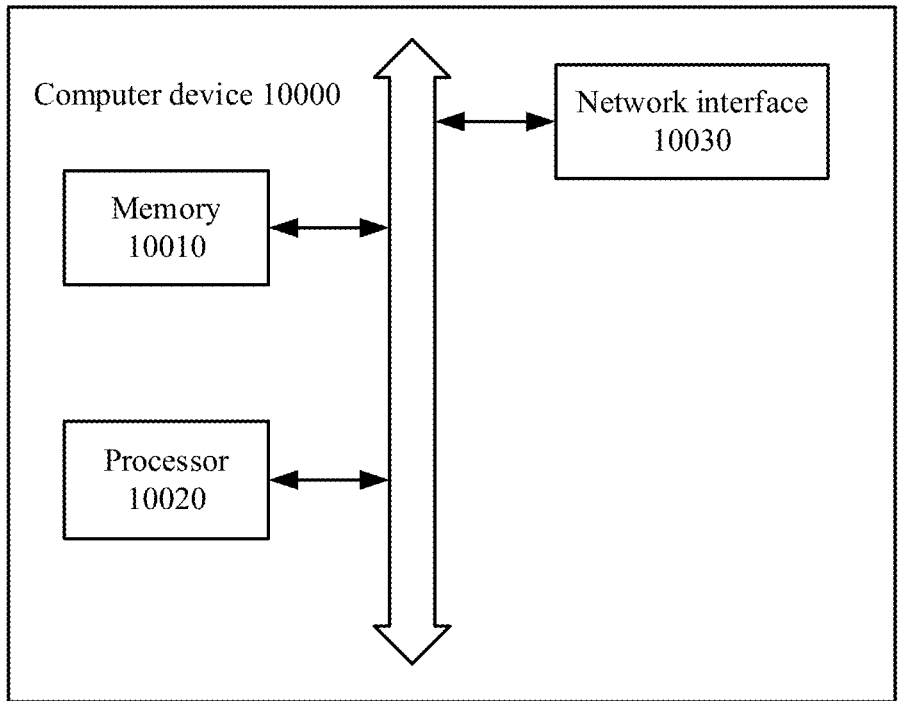
FIG. 15 is a schematic diagram of a hardware architecture of a computing device suitable for implementing a storyboard script generation method according to Embodiment 5 of this application.

FIG. 15 is a schematic diagram of a hardware architecture of a computing device 10000 suitable for implementing a storyboard script generation method according to Embodiment 5 of this application. In this embodiment, the computing device 10000 is a device that can automatically calculate a value and/or process information based on an instruction that is set or stored in advance. For example, the computing device 10000 may be a smartphone, a tablet computer, a notebook computer, a desktop computer, a rack server, a blade server, a tower server, or a cabinet server (including an independent server, or a server cluster including a plurality of servers). As shown in FIG. 15, the computing device 10000 at least includes but is not limited to a memory 10010, a processor 10020, and a network interface 10030 that can be communicatively connected to each other by using a system bus.

The memory 10010 includes at least one type of computer-readable storage medium. The readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the memory 10010 may be an internal storage means of the computing device 10000, for example, a hard disk or an internal memory of the computing device 10000. In some other embodiments, the memory 10010 may be an external storage device of the computing device 10000, for example, a removable hard disk, a smart media card (SMC), a secure digital (SD) card, or a flash card that is disposed on the computing device 10000. Certainly, the memory 10010 may alternatively include both an internal storage means of the computing device 10000 and an external storage device of the computing device 10000. In this embodiment, the memory 10010 is usually configured to store an operating system and various types of application software that are installed on the computing device 10000, for example, program code of the storyboard script generation method. In addition, the memory 10010 may be further configured to temporarily store various types of data that have been output or are to be output.

The processor 10020 may be a central processing unit (CPU), a controller, a microcontroller, a microprocessor, or another data processing chip in some embodiments. The processor 10020 is usually configured to control an overall operation of the computing device 10000, for example, perform control and processing related to data exchange or communication performed by the computing device 10000. In this embodiment, the processor 10020 is configured to run program code stored in the memory 10010 or process data.

The network interface 10030 may include a wireless network interface or a wired network interface, and the network interface 10030 is usually configured to establish a communication link between the computing device 10000 and another computing device. For example, the network interface 10030 is configured to: connect the computing device 10000 to an external terminal by using a network, and establish a data transmission channel, a communication link, and the like between the computing device 10000 and the external terminal. The network may be a wireless or wired network such as an intranet, the Internet, a global system for mobile communications (GSM), wideband code division multiple access (WCDMA), a 4G network, a 5G network, Bluetooth, or Wi-Fi.

It should be noted that FIG. 15 shows only a computing device with the components 10010 to 10030. However, it should be understood that implementation of all the shown components is not required, and more or fewer components may alternatively be implemented.

In this embodiment, the storyboard script generation method stored in the memory 10010 may be further divided into one or more program means to be executed by one or more processors (the processor 10020 in this embodiment), to complete this embodiment of this application.

Embodiment 6

This embodiment of this application further provides a computer-readable storage medium. The computer-readable storage medium stores computer-readable instructions. The computer-readable instructions are executed by a processor to implement the following steps:

obtaining a reference image used to draw a storyboard script;

obtaining an element of the reference image and element vector information of the element;

obtaining a vector element matching the element; and setting the vector element on a specified canvas according to the element vector information to generate the storyboard script.

Alternatively, the computer-readable instructions are executed by the processor to implement the following steps:

obtaining input information, where the input information includes a keyword; and obtaining a reference storyboard script associated with the keyword from a vectorized script library, where the vectorized script library includes a plurality of candidate storyboard scripts, and the plurality of candidate storyboard scripts are generated according to the method in Embodiment 1.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the computer-readable storage medium may be an internal storage unit of a computing device, for example, a hard disk or an internal memory of the computing device. In some other embodiments, the computer-readable storage medium may be an external storage device of the computing device, for example, a removable hard disk, a smart media card (SMC), a secure digital (SD) card, or a flash card that is disposed on the computing device. Certainly, the computer-readable storage medium may alternatively include both an internal storage unit of the computing device and an external storage device of the computing device. In this embodiment, the computer-readable storage medium is usually configured to store an operating system and various application software that are installed on the computing device, for example, program code of the storyboard script generation method in the embodiments. In addition, the computer-readable storage medium may be further configured to temporarily store various types of data that have been output or are to be output.

Clearly, a person skilled in the art should understand that the foregoing means or steps in the embodiments of this application may be implemented by using a general computing apparatus. The means or steps may be integrated into a single computing apparatus or distributed in a network including a plurality of computing apparatuses. Optionally, the means or steps may be implemented by using program code that can be executed by the computing apparatus. Therefore, the means or steps may be stored in a storage apparatus for execution by the computing apparatus. In addition, in some cases, the shown or described steps may be performed in a sequence different from the sequence herein. Alternatively, the means or steps may be separately made into integrated circuit means, or a plurality of means or steps in the means or steps may be made into a single integrated circuit means for implementation. In this way, a combination of any specific hardware and software is not limited in the embodiments of this application.

The foregoing descriptions are merely preferred embodiments of this application, and are not intended to limit the scope of this application. Any equivalent structure or equivalent procedure change made based on the content of this specification and the accompanying drawings of this application is directly or indirectly applied to other related technical fields, and shall fall within the protection scope of this application.

What is claimed is:

1. A method of generating a storyboard script, comprising:
obtaining a reference image;
identifying an element in the reference image;
determining element vector information of the element;
obtaining a vector element matching the element, wherein the obtaining a vector element matching the element comprises obtaining the vector element associated with an element attribute of the element from a vector element material library; and
generating the storyboard script by setting the vector element on a specified canvas based on the element vector information of the element.

2. The method according to claim 1,
wherein the element vector information comprises a size of the element, a posture of the element, and a relative location of the element in the reference image; and
wherein the generating the storyboard script by setting the vector element on the specified canvas based on the element vector information comprises:
setting the vector element on the specified canvas based on the size of the element, the posture of the element, and the relative location of the element in the reference image.

3. The method according to claim 1, further comprising:
identifying a scene attribute of the reference image; and
obtaining the specified canvas from a canvas material library based on the scene attribute, wherein the specified canvas is associated with the scene attribute.

4. The method according to claim 1,
wherein the storyboard script comprises an editable vector graph; and
wherein the method further comprises:
performing vectorized modifications on the storyboard script based on vectorized modification information.

5. The method according to claim 1, further comprising:
generating the storyboard script by adjusting an arrangement of the vector element on the specified canvas based on user preference information.

6. The method according to claim 1, wherein the reference image is a key frame of a video, or the reference image is an image uploaded by a user.

7. The method according to claim 1, further comprising:
evaluating a quality of the storyboard script in response to determining that the reference image is an image uploaded by a user; and storing the storyboard script in a vectorized script library in response to determining that the quality of the storyboard script is greater than a preset value, wherein the vectorized script library comprises a plurality of storyboard scripts.

8. The method according to claim 7, further comprising:
obtaining input information, wherein the input information comprises a keyword;
obtaining a reference storyboard script associated with the keyword from the vectorized script library; and
generating a new storyboard script by performing vectorized modifications on the reference storyboard script based on vectorized modification information.

9. A computing device, comprising a memory, a processor, and computer-readable instructions stored in the memory and executable by the processor, wherein the processor executes the computer-readable instructions to implement operations comprising:
obtaining a reference image;
identifying an element in the reference image;
determining element vector information of the element;
obtaining a vector element matching the element, wherein the obtaining a vector element matching the element comprises obtaining the vector element associated with an element attribute of the element from a vector element material library; and
generating the storyboard script by setting the vector element on a specified canvas based on the element vector information of the element.

10. A non-transitory computer-readable storage medium, storing computer-readable instructions, wherein the computer-readable instructions upon execution by at least one processor cause the at least one processor to perform operations comprising:
obtaining a reference image;
identifying an element in the reference image;
determining element vector information of the element;
obtaining a vector element matching the element, wherein the obtaining a vector element matching the element comprises obtaining the vector element associated with an element attribute of the element from a vector element material library; and
generating the storyboard script by setting the vector element on a specified canvas based on the element vector information of the element.

11. The computing device according to claim 9, wherein the element vector information comprises a size of the element, a posture of the element, and a relative location of the element in the reference image; and
wherein the generating the storyboard script by setting the vector element on the specified canvas based on the element vector information comprises:
setting the vector element on the specified canvas based on the size of the element, the posture of the element, and the relative location of the element in the reference image.

12. The computing device according to claim 9, the operations further comprising:
identifying a scene attribute of the reference image; and
obtaining the specified canvas from a canvas material library based on the scene attribute, wherein the specified canvas is associated with the scene attribute.

13. The computing device according to claim 9,
wherein the storyboard script comprises an editable vector graph; and wherein the operations further comprise:

performing vectorized modifications on the storyboard script based on vectorized modification information.

14. The computing device according to claim 9, the operations further comprising:

generating the storyboard script by adjusting an arrangement of the vector element on the specified canvas based on user preference information.

15. The computing device according to claim 9, the operations further comprising:

evaluating a quality of the storyboard script in response to determining that the reference image is an image uploaded by a user; and storing the storyboard script in a vectorized script library in response to determining that the quality of the storyboard script is greater than a preset value.

16. The computing device according to claim 9, the operations further comprising:

generating a vectorized script library by storing the generated storyboard script into the vectorized script library, wherein the vectorized script library comprises a plurality of storyboard scripts.

17. The computing device according to claim 16, the operations further comprising:

obtaining input information, wherein the input information comprises a keyword;

obtaining a reference storyboard script associated with the keyword from the vectorized script library; and generating a new storyboard script by performing vectorized modifications on the reference storyboard script based on vectorized modification information.

18. The non-transitory computer-readable storage medium according to claim 10, wherein the element vector information comprises a size of the element, a posture of the element, and a relative location of the element in the reference image; and wherein the generating the storyboard script by setting the vector element on the specified canvas based on the element vector information comprises:

setting the vector element on the specified canvas based on the size of the element, the posture of the element, and the relative location of the element in the reference image.

19. The non-transitory computer-readable storage medium according to claim 10, the operations further comprising:

identifying a scene attribute of the reference image; and obtaining the specified canvas from a canvas material library based on the scene attribute, wherein the specified canvas is associated with the scene attribute.

20. The non-transitory computer-readable storage medium according to claim 10, wherein the storyboard script comprises an editable vector graph; and wherein the operations further comprise:

performing vectorized modifications on the storyboard script based on vectorized modification information.

* * * * *